United States Patent [19]

Saam

[11] Patent Number: 5,856,401

[45] Date of Patent: Jan. 5, 1999

[54] METHOD OF PREPARING CONDENSATION POLYMERS BY EMULSION POLYMERIZATION

[75] Inventor: John C. Saam, Midland, Mich.

[73] Assignee: Saam Associates, Midland, Mich.

[21] Appl. No.: 13,947

[22] Filed: Jan. 27, 1998

Related U.S. Application Data

[63] Continuation-in-part of Ser. No. 058,621, May 6, 1993, abandoned.

[51] Int. Cl.$^6$ ............................... C08F 2/16; C08G 63/78
[52] U.S. Cl. ..................... 524/800; 528/274; 528/302; 528/303; 528/307; 528/308; 525/437; 525/448; 524/601; 524/742; 524/745; 524/755
[58] Field of Search ................................. 528/274, 302, 528/303, 307, 308; 525/437, 448; 524/601, 742, 745, 755, 800

[56] References Cited

U.S. PATENT DOCUMENTS 4,355,154  10/1982  Saam et al. .............................. 528/274
4,374,953  2/1983  Chou et al. ............................. 525/153

*Primary Examiner*—Sam A. Acquah
*Attorney, Agent, or Firm*—Robert L. McKellar

[57] ABSTRACT

A method wherein polyesters are prepared under mild conditions by directly condensing hydroxycarboxylic acids or mixtures of polyfunctional alcohols and carboxylic acids in hydrophobic media using heterogeneous catalysts that can form a hydrophilic phase. The systems are inverse emulsions, inverse microemulsions and solid-in-liquid dispersions.

19 Claims, No Drawings

METHOD OF PREPARING CONDENSATION POLYMERS BY EMULSION POLYMERIZATION

This application is a continuation-in-part of U.S. patent application, Ser. No. 08/058,621, filed May 6, 1993, now abandoned.

BACKGROUND OF THE INVENTION

Polyesters, although one of the older commercial synthetic polymer systems, continue to meet a wide range of human needs and remain industrially important. This invention relates to the preparation of synthetic organic polymers. More particularly, this invention relates to the preparation of condensation polymers such as from hydroxycarboxylic acids or from polyfunctional alcohols and polyfunctional carboxylic acids.

Condensation polymers derived from di- and other polyfunctional alcohols include, among others, saturated and unsaturated polyesters, polyester-amides, polyurethanes and polyacetals. Polyesters are a particularly preferred class of condensation polymers because their properties make them suitable for a variety of end use applications including textile fibers, films, coatings and engineering plastics. By judiciously selecting monomers and polymerization conditions, it is possible to optimize the properties desired for a particular end use.

A conventional method for preparing polyesters and other condensation polymers derived from hydroxyl containing monomers is by direct esterification, whereby the appropriate monomers, usually polyhydric alcohols or phenols and aliphatic, cycloaliphatic, or aromatic polycarboxylic acids are reacted together by melt-polycondensation at temperatures often exceeding 250° C. to favorably drive the equilibria by removing the water that is formed as a by-product of the esterification reaction. The conditions required to obtain condensation polymers of the desired molecular weight are disclosed in numerous patents and other texts.

The standard industrial procedure for acquiring polyesters is to maintain the reagents in a molten state throughout the polymerization reaction. In this method, the water produced as a by-product of the reaction is continuously removed during the polymerization, generally by the use of vacuum or by azeotropic distillation.

It is known that the reaction between an alcohol and a carboxylic acid involves an equilibrium that can be represented by the equation:

In the foregoing equation when R and R' are hydrocarbyl groups, the reaction is referred to as a "direct esterification".

The prior art teaches that removal of the by-product water is essential to avoid hydrolysis of the desired ester. This requirement also applies to polyesterification reactions, the only difference being that the carboxylic acid and the alcohols represented by ROH in the foregoing equation are polyfunctional.

It is also well known that the molecular weight of a polyester formed by direct esterification is determined to a large extent by the efficiency with which the by-product is removed from the reaction mixture. If the desired molecular weight is relatively low, the water can be evaporated or distilled under atmospheric pressure from a reaction mixture wherein the reagents are in a molten form and at a temperature of from about 150° to 200° C. or greater. This process can often be facilitated if an inert gas is passed through the reactor. To achieve the higher molecular weights desired for textile fiber production or coatings, it is usually necessary to either completely remove the water under reduced pressure or employ an organic solvent that forms an azeotropic mixture with the by-products. One disadvantage inherent in the foregoing prior art teachings is that the energy input required to remove the by-product substantially increases the cost of manufacturing polyesters. Another major disadvantage that needs mentioning is that of side reactions at the high temperatures, such as group scrambling which ruins the designed structure of the desired polymers and, double-bond coupling, etherification of carbinols, decarboxylation, ester bond pyrolysis and intermolecular scrambling through transesterification, that leads to gellation, darkening of the resin, and the like.

In addition, another disadvantage associated with preparing condensation polymers by conventional polymerization techniques is that the high viscosity exhibited by these products makes them difficult to transfer and handle.

Thus, while the melt process is efficient and economic, utility is limited to those systems capable of withstanding the high process temperatures. Polyesters with sensitive structures are obtained at lower temperatures by methods requiring special reagents that produce unwanted by-products. Common examples include polycondensation of dicarboxylic acid chlorides with diols using acid acceptors or displacement reactions of reactive halides with carboxylate salts. Until recently reference has been nonexistent to direct polyesterfication under mild conditions of carboxylic acids with carbinols without the use of special reagents. The search therefore continues for effective low temperature alternatives where the inherent advantages of direct esterification are retained, that is, where the monomers are readily available and inexpensive and where problems disposing of the by-product, water, are minimal.

The instant invention method shows a method of direct polyesterification in heterogeneous media where the by-produced water forms in a hydrophobic phase and transfers to a hydrophilic phase. The free energy released in the transfer becomes a principal driving force for the overall process. Low temperatures suppress side reactions and allow the inclusion of temperature sensitive structures that would be normally destroyed in a typical high temperature process. By judiciously selecting monomers, temperature, catalyst and amounts of water present it is possible to optimize polymer properties for a particular end use.

One method for avoiding the problems associated with the manufacture and processing of relatively high molecular weight polymers in molten or solubilized form is to employ a technique known as emulsion polymerization whereby one or more monomers are reacted in an aqueous medium containing large amounts of water, a catalyst and, usually, one or more surfactants. The final polymer is obtained as an aqueous emulsion or latex exhibiting a relatively low viscosity sometimes approaching that of water. Heretofore emulsion polymerization of organic monomers employing water as the continuous phase has been employed substantially exclusively for the polymerization of ethylenically unsaturated compounds in the presence of free radical sources, such as organic peroxides. Since the presence of even small amounts of water during condensation polymerizations involving polyhydric alcohols and polyfunctional carboxylic acids have been shown to substantially reduce the molecular weight of the resultant polyester, emulsion polymerization in aqueous media would not have been considered a practical means for preparing condensation polymers in general, and particularly polyesters and other polymers derived from polyfunctional alcohols.

Since emulsion polymerization employs an aqueous phase, this relatively large amount of water would be expected to displace the equilibrium of the polyesterification reaction in the direction of degradation of any polymer formed to the corresponding polyfunctional carboxylic acid and alcohol. It did not therefore appear obvious to employ either of these techniques as a means for preparing commercially useful polyesters. However, Saam et al in U.S. Pat. No. 4,355,154, issued on Oct. 19, 1982 and U.S. Pat. No. 4,374,953, issued Feb. 22, 1983 deal with such emulsion preparations of polyesters and polyacetals.

These references however do not teach that specifying the amount of water, or its mode of addition, might be advantageous to obtaining high conversions of carboxylic acid groups. Likewise, they do not specify that use of the catalysts that form a separate phase in the oil phase might be advantageous in obtaining high conversions either.

The '154 patent deals with a method for preparing condensation polymers by emulsion polymerization by reacting aqueous compositions containing an emulsified hydroxyacid or an emulsified mixture comprising a polyfunctional carboxylic acid or anhydride and a polyfunctional alcohol. The emulsion also contains a suitable polycondensation catalyst. The polyesters prepared by that method are alleged to be useful as plasticizers and as precursors for alkyd resins and other polymers.

The '953 patent deals with a method for preparing polyacetals and polyketals by emulsion polymerization by reacting emulsified carbonyl compounds with emulsified polyfunctional alcohols in aqueous media and in the presence of specified polycondensation catalysts. It is alleged that coherent films of the resultant polymers can applied to substrates from aqueous or non-aqueous media.

More specifically, U.S. Pat. No. 4,355,154 teaches that the amount of water is not critical (cf. column 7, lines 13 to 26) as long as the polyol is not appreciably soluble. Example 1 of U.S. Pat. No. 4,355,154 implies that the catalyst is the last ingredient to be included and all but examples 3, 4, and 7, follow the general procedure in example 1. Examples 4, and 7 follow a procedure resembling the method taught herein, but the monomers are acid anhydrides, in a pre-reaction, conducted in the absence of water. Water in excess of the limits taught by the instant invention is later introduced. Likewise, it is neither taught or claimed in any of these references that solvent can be included to reduce viscosity or prevent crystallization, which was often a problem in the methods of these references, especially at low polymerization temperatures.

The instant invention method is distinguished from that prior art in providing a procedure which provides polymers having significantly higher conversions of the carboxylic acids and polymers having significantly higher molecular weights and which allows the previously undisclosed use of certain solvents.

This invention also provides for low polymerization temperatures, sometimes as low as room temperature which results in suppressing undesired side reactions associated with high temperature polyesterfication such as etherification, oxidation, and the like. This invention provides more latitude on the types of monomers that can be used for the condensation reactions. For example, this invention extends the utility of the emulsion polymerization to the more water soluble carboxylic acids and carbinols commonly used in coating resins without resorting to acid anhydrides which are available for only a limited number of monomers.

THE INVENTION

Thus, there is provided herein a method for preparing a polyester, the method comprises dispersing one or more reactive monomers in a hydrophobic solvent. The reactive monomers are selected from the group consisting essentially of monomers having at least two hydroxyl groups; monomers having at least two carboxyl groups and, monomers having a combination of hydroxyl groups and carboxyl groups. There are species present in the diluent having at least one hydroxyl group and at least one carboxyl group and it is required that each monomer have at least partial solubility in the diluent.

Thereafter, there is added a strongly acidic catalyst which will form a separate dispersed phase. Thereafter, the monomers and the catalyst are reacted at a time and at a temperature sufficient to form by-produced water and a product which is pre-selected from the group consisting essentially of inverse dispersions, inverse emulsions, or inverse microemulsions. The pre-selection is based upon the type and number of monomers, the catalyst, and the solvents used in the reaction. Further, it is required that during the reaction, any water that is generated during the reaction is adjusted such that the amount of water present at the end of the reaction is from 1 to 20 weight percent based on the total incipient monomer weight.

The reactive monomers used herein must be at least partly soluble in the hydrophobic phase, that is, they must form a separate phase under the conditions of the reactions used herein and be at least partly soluble in the non-aqueous phase. The number of carbon atoms, melting point, temperature and amount of solvent will determine monomer utility. The monomers useful herein comprise at least one member selected from the group consisting of hydroxycarboxylic acids containing at least six carbon atoms and mixtures comprising alcohols containing at least six carbon atoms and a carboxylic acid containing at least five carbon atoms, and mixtures comprising the alcohols and carboxylic acids in order to obtain the requisite hydrophobic solvent solubility needed herein for this invention. It is contemplated within the scope of this invention to react monomeric alcohols and/or carboxylic acids or their derivatives described above to form oligomers so that they become soluble in hydrophobic solvents, and thus become useful reactants herein. The monomers useful herein need not all be polyfunctional either.

Thus, when a drying oil is used to make an alkyd, one could use linoleic acid or linolenic acid, which only have one carboxylic acid group and thus are monofunctional. It should be understood by those skilled in the art, that in order for the monomers to be useful herein, the combined reactive monomers must have an average functionality of greater than 1.

Representative carboxylic acids that can be reacted to form polyesters in accordance with the method of this invention include, at least, adipic, suberic, azelaic, 1,8-octanedioic, 1,10-decanedioic, 1,12-dodecanedioic, which may contain halogen or other groups as substituents on the alkyl chain, carboxylated polystyrene and partly hydrolyzed poly(methyl methacrylate).

Alcohols that can be reacted to form polyesters in accordance with the method of this invention are non-phenolic and are represented at least, by 1,8-octanediol, 1,10-decanediol, 1,12-dodecane-diol, and partial reaction products of isomeric cyclohexane-diols, 1,4-bis(hydroxymethyl) cyclohexane, 1,2- and 1,4-benzenedimethanol, glycerol, 1,2,-butanediol, pentaerthritol and dipentaerthritol with anhydrides or isocyanates or other agents, that render them soluble in hydrophobic solvents. Some preferred polyfunctional alcohols include 1,10-decanediol, trimethanolpropane reacted equimoler with nadic anhydride and the oligomeric copolymers of styrene and allyl alcohol, hydrolyzed polyvinylacetate and glycerides. Other reactive derivatives of carboxylic acids such as acid chlorides or methyl esters may also be used to make, by known methods, partial esters of the polyols in order to render the system soluble in hydrophobic solvents if the original alcohols or acids are insoluble in a hydrophobic solvent, such as glycerin and the isomeric phthalic acids.

Another class of materials that will form polyesters when reacted in accordance with the present method are the oligomeric compounds prepared by reacting a stoichiometric excess of a di- or polyfunctional acid or alcohol with a di-or polyfunctional reagent that will react with these compounds to form chemical bonds. The resultant oligomer contains carboxy or hydroxyl end groups and is subsequently reacted with a polyfunctional alcohol or carboxylic acid, respectively. In a preferred embodiment, a diisocyanate is reacted with a stoichiometric excess of a diol such as 1,6-hexanediol. The resultant hydroxyl-terminated oligomer contains internal urethane linkages —HNC(C=O))—, and is subsequently blended together with a stoichiometric amount of a dicarboxylic acid such as phthalic acid, and a poly-condensation catalyst. The resultant composition is then reacted to yield a urethane-modified polyester.

In place of all or a portion of the aforementioned polyfunctional alcohols and carboxylic acids, one can employ a hydroxycarboxylic acid that is hydrocarbon soluble where the hydroxyl group is at least one or more carbon atoms removed from the carboxyl group. Suitable hydroxycarboxylic acids include but are not limited to the isomeric hydroxyhexanoic, hydroxyoctanoic, hydroxystearic, hydroxyalkylbenzoic and hydroxyalkylnaphthoic acids wherein the hydroxyalkyl groups are preferably hydroxyethyl or greater, this preference being based on the availability of the corresponding hydroxycarboxylic acids and the avoidance of lactide ring formation, which is a chemical tendency with hydroxymethyl.

The catalysts useful in this invention must form a separate phase in the hydrophobic solvent containing the monomers and comprise at least one catalyst selected from the group consisting of mineral acids, organic sulfonic acids, salts of organic sulfonic acids in combination with strong mineral acids, it being noted that salts of organic sulfonic acids do not work exceptionally well in this invention, half-esters of sulfuric acid or bisulfates and alkali metal salts of sulfuric acid half esters wherein the alcohol residue contains at least twelve carbon atoms, but only in the presence of strong acids.

The catalysts of this invention are used at concentration levels that will effectively catalyze the polymerization reaction and yield a polyester having a desired combination of properties. The optimum catalyst and concentration level for a given polymerization is dependent on a number of variables, including the types of monomers being reacted and the ultimate degree of polymerization desired. The catalysts are usually present at concentrations of from 0.01 to 30 weight percent, based on total monomer weight. To achieve the desired degree of polymerization following a reasonable reaction time, the catalyst concentration is preferably from 0.1 to 20 percent, most preferably from 0.5 to 10 percent.

Preferably the polycondensation catalyst is selected from the group consisting of sulfuric acid, hydrochloric acid, perchloric acid, aliphatic and aromatic sulfonic acids, esters of sulfuric acid, and alkali metal salts of aromatic sulfonic acids when combined with mineral acids.

Representative sulfonic acids that are commercially available include methanesulfonic, trifluoromethanesulfonic, benzenesulfonic, dodecylbenzenesulfonic, dodecyldiphenyloxidesulfonic, 5-methyl-1-naphthylenesulfonic, p-toluenesulfonic acid and 5-sulfonatophthalic acid and sulfonated polystyrene, crosslinked sulfonated polystyrene and the super-acidic sulfonates derived from poly(tetrafluoroethylenes). Suitable half esters of sulfuric acid include the lauryl, stearyl, hexadecyl and eicosanyl esters. Furthermore, when long chain diols are used with $H_2SO_4$, it is believed that a surfactant is made in-situ:

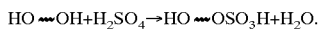
$$HO\text{\textasciitilde}OH+H_2SO_4 \rightarrow HO\text{\textasciitilde}OSO_3H+H_2O.$$

This transports the $H_2SO_4$ to the oil phase from the water phase (oil/water interface) to catalyze the reaction and thus meets one of the basic requirements of the instant invention.

Turning now to the method of this invention which relies on a polyesterification reaction there is disclosed a method for preparing a polyester polymer wherein the method comprises (I), dispersing one or more reactive monomers in a hydrophobic diluent. The reactive monomers are selected from the group consisting essentially of (i) monomers having at least two hydroxyl groups; (ii) monomers having at least two carboxyl groups and, (iii) monomers having a combination of hydroxyl groups and carboxyl groups, wherein there is present in the diluent, species having at least one hydroxyl group and at least one carboxyl group. Each monomer has at least partial solubility in the diluent.

Thereafter a strongly acidic catalyst is added to (I) which forms a separate dispersed phase. Thereafter, the monomers and the catalyst are reacted at a time and at a temperature sufficient to form by-produced water and a product, which is pre-selected by selection of monomers and catalyst, which are inverse dispersions, inverse emulsions, or, inverse microemulsions. It is critical for this invention that during the reaction, the water that is generated during the reaction is adjusted such that the amount of water present at the end of the reaction is from 1 to 20 weight percent based on the total incipient monomer weight in (I).

It is important to note that the form of the products is just the opposite of the oil and water dispersion of the '154 patent and thus, are inherently different than the emulsion systems of the '154 patent, especially in terms of the higher molecular weights of the resins of the instant invention. The Mn's produced under the present invention are 3600 or greater, and the minimum GPC Mn is 3800 in order to obtain some of the desirable properties suggested herein.

It is preferred in this method to first dissolve, or partly dissolve the monomers then disperse the catalyst, and finally adjust the temperature. Rigorous methods are not employed to thoroughly remove by-produced water during the reaction as is typically done in this type of polymerization, such as subjecting the polymerizing mass to a vacuum and high temperatures typically greater than 200° C. Work-up of the resulting product involves separation of the polymer solution from the catalyst by any conventional means, such as, for example, cation exchange resins can be separated by simple filtration. In the case of other sulfonic acids, they generally must be neutralized or adsorbed from the polymer solution on a suitable substrate.

Water content is adjusted with the water produced in the polymerization of the reactants so that it falls in the range from a trace at the beginning of the polymerization from any source such as any indigenous water adsorbed from the atmosphere on the catalyst or monomers, to a value of from 1 to 20 weight percent based on the weight of the incipient monomer or monomers, at the end of the polymerization. The preferred amount at the end of the reaction is from 5 to 10 weight %. The required amount of water can be easily attained by simply conducting the process in a sealed reactor or, better, in an open reactor configured to allow a gentle purge of an inert gas and equipped with an efficient condenser system to remove water vapor and return any evaporating or entrained solvent to the reactor. It is therefore preferred not to add any water to the system unless it is essential as a vehicle to deliver a catalyst or monomer or is already present in large amount in a catalyst or monomer. In such cases, the water must be removed so that its final content will fall within the limits of the present specification such that it does not exceed twenty weight percent based on the weight of the incipient monomer or monomers.

The temperature and reaction times depend on the catalyst, monomer system and the amount and type of solvent. Temperatures should be below the normal boiling point of the solvent used and can range from just above the freezing point of the system to 135° C., and preferably from ambient to 80° C. The reaction times can vary from 6 hours to two weeks, but it is preferred that the reaction time be from 12 to 72 hours.

Solvents can be used throughout the reaction, not just temporarily as an aid to help homogenize the monomer as shown in example 8 of '154 and, the solvents used in the instant method may be partly removed during polymerization, or partly or completely removed after the polymerization.

To be useful in this invention, solvents must be insoluble in the aqueous phase and non-reactive with the intended reactants. Thus, examples of solvents useful herein can be aliphatic, aromatic, aromatic-aliphatic, saturated or unsaturated, halogenated solvents, or an ether. Examples of preferred solvents are toluene, and xylene, especially toluene because of its insolubility in water and its good solvent power for certain monomers and polymers. Methylene chloride is also a preferred effective solvent for similar reasons. Methylene chloride is preferred because it is not only effective but also because it can be easily removed and recycled when solvents are undesirable in the final product. Throughout the reaction, solvents for the monomers, polymer or both may be used that are 6.5% to 99% by weight of the total system but preferably from about 20% to about 75% of the total system.

It can thus be understood by those skilled in the art that a multitude of new materials can result from the method of this invention, and that further, functional monomers can be incorporated in the polymers formed by this method which are capable of being cured to films, coatings, and the like with or without the commensurate use of additional curing materials. Contemplated within the scope of this invention with regard to functional materials are such materials as sulfonated carboxylic acids, carboxylic acids containing unsaturation, acrylic-functional carbinol materials, including methacrylates and acrylates, salts of amino-functional carbinols, carbinol bearing quaternary ammonium structures, and carbinol or carboxylic acid bearing reactive halogens.

Now, the following examples will illustrate the invention, it being understood that the invention defined herein should not be limited by the scope of the examples.

Number ($M_n$) and weight ($M_w$) average molecular weights were determined by gel phase chromatography (GPC) on a Waters 717 system equipped with a refractive index detector and 10 micron mixed gel columns from Polymer Laboratories Inc. The mobile phase, tetrahydrofuran, was at a flow rate of 1.0 ml/min. Calibration was with polystyrene standards. NMR spectra were conducted with a Varian Unity-300 with samples dissolved in chloroform-d and referenced to tetramethylsilane. Frequencies for $^{13}C$ NMR spectra were at 75.4 MHZ with an acquisition time of 1.81 s and, for $^1H$ NMR spectra, at 300 Mhz with an acquisition time of 3.74 s. Values of Mn were determined from the relative area intensities of signals from the polymer end groups to those of the repeat units and were within 10% of those determined by GPC.

Monomers were purchased from the Aldrich Chemical Company, Milwaukee, Wis. Azelaic acid was recrystallized from toluene and twice from chloroform. 1,10-Decanediol was recrystallized from tetrahydrofuran, then twice from chloroform. 12-Hydroxydodecanoic acid was recrystallized twice from chloroform. 12-Hydroxystearic acid, 90%, (12-Hydroxyoctadecanoic acid) was recrystallized twice from toluene, twice from chloroform and twice from acetone. Other monomers were used as received. Dodecybenzenesulfonic acid (DBSA), was sourced from Stepan Chemical Company, Northfield, Ill. Amberlyst-15 is a product of the Rohm and Haas Company, Philadelphia, Pa. Nafion H, manufactured by E. I. DuPont De Nemours & Company, Wilmington, Del., was purchased from Aldrich Chemical Company.

EXAMPLE 1

Polycondensation in an Open System

In a typical run exactly 3.7645 g. (20.000 mmol) of azelaic acid, 3.4857 g. (20.000 mmol) of 1,10-Decanediol, 1.00 g. of DBSA (3.0 meq. of $H^+$) and 10.0 ml of toluene were weighed into a 50 ml glass reactor equipped with a magnetic stirrer. The mixture was briefly heated to about 70° to 80° C. with stirring to dissolve the monomers and catalyst. After cooling to 40° to 60° C., the reactor was equipped with a nitrogen inlet and a distillation head which could serve both as a reflux condenser and a receiver for any water azeotrope that might collect. The reactor was immersed in a 60° C. constant temperature oil bath and the mixture was continuously stirred as a flow of 11–14 ml of nitrogen/min. was passed over the surface of the mixture. The initially cloudy mixture cleared after 4 to 5 hr. and any entrained toluene slowly refluxed. Typically there was some loss of solvent and it was necessary occasionally to add 1 to 3 ml to maintain constant volume. After 48 hr., about 0.3 ml of water along with toluene accumulated in the side-arm of the distillation head. The viscosity of the mixture noticeably increased and a Tyndall effect was apparent when the mixture was placed in a columnated beam of white light. No further change was evident after this period and after 72 hr. the reaction was terminated by adding 0.5 ml of pyridine. Most of the toluene was evaporated in a vacuum at room temperature. The residue was stirred briefly in 50 ml of boiling methanol and the insoluble solid filtered after cooling to room temperature. The extraction with methanol was repeated and the product was dried in a vacuum at room temperature for 18 hrs. to give 5.974 g. (91.5%) of a crystalline polymer. GPC gave $M_n$=11,500 and $M_w$=19,800.

Chemical shifts from $^{13}C$ NMR and $^1H$ NMR are consistent with poly(decamethylene azelate). Results from runs conducted by the same procedure but at different temperatures and with different catalysts are summarized in TABLE I.

TABLE I

| RUN | CATALYST | 0° C. TEMPERATURE | % YIELD | Mn | Mw | Mw/Mn |
|---|---|---|---|---|---|---|
| 1 | DBSA[a] | 30 | 81.9 | 6,700 | 10,500 | 1.6 |
| 2 | DBSA[a] | 40 | 90.2 | 25,000 | 38,600 | 1.5 |
| 3 | DBSA[a] | 60 | 91.5 | 11,500 | 19,800 | 1.7 |
| 4 | DBSA | 75 | 94.3 | 18,900 | 32,200 | 1.9 |
| 5 | Amb-15[b] | 40 | 73.0 | 4,700 | 6,700 | 1.4 |
| 6 | Amb-15[b] | 60 | 89.4 | 36,500 | 57,900 | 1.6 |
| 7 | Amb-15[b] | 75 | 90.3 | 12,700 | 24,000 | 1.9 |
| 8 | Naf H[c] | 40 | 23.9 | 1,250 | 2,000 | 1.6 |
| 9 | Naf H[c] | 60 | 85.7 | 10,000 | 17,600 | 1.8 |
| 10 | Naf H[c] | 75 | 90.2 | 13,400 | 24,900 | 1.9 |

[a] = Dodecylbenzenesulfonic acid;
[b] = Amberlyst-15;
[c] = Nafion H

EXAMPLE 2

Polycondensation In a Closed System

In a typical preparation, exactly 3.7645 g. (20.000 mmol) of azelaic acid, 3.4857 g. (20.000 mmol), 1.00 g. of DBSA (3.0 meq. of H$^+$) and 10.0 ml of toluene were weighed into a 30 ml screw-capped vial equipped with a magnetic stirrer. The mixture was heated to about 70° to 80° C. to dissolve the monomers and catalyst. The cap was tightened and the mixture was placed in a constant temperature bath and held at 60° C. while being continuously stirred. After about ½ hr. the mixture became cloudy but cleared after about 2 hrs. Condensate accumulated and refluxed on the vessel walls and an increase in viscosity was noted. After 72 hr. the reaction was terminated and the product isolated by the procedure of Example 1 to give 4.90 g. (75.0% of yield) of crystalline polymer. GPC gave Mn=3,800, and Mw=5,980. The $^{13}$C NMR and $^1$H NMR were consistent with poly (decamethylene azelate). Polycondensations catalyzed with Amberlyst$^R$-15 or Nafion$^R$ HNR50 were conducted with 1.00 g. of resin and the resulting polymers were isolated by the same procedure as was used in Example 1. The results are found in Table II.

TABLE II

| RUN | CATALYST | °C. TEMP. | DILUENT | % YIELD | Mn | Mw | /Mn |
|---|---|---|---|---|---|---|---|
| 1 | DBSA | 60 | none[a] | 65.2 | 2,900 | 4,100 | 1.4 |
| 2 | DBSA | 60 | toluene | 75.0 | 3,800 | 6,000 | 1.6 |
| 3 | DBSA | 60 | nonane[d] | 73.2 | 5,200 | 8,700 | 1.7 |
| 4 | Amb-15 | 60 | toluene | 73.7 | 4,100 | 5,400 | 1.3 |
| 5 | NaF H | 60 | toluene | 72.0 | 6,100 | 9,100 | 1.5 |
| 6 | H$_3$PO$_{4b}$ | 25 | toluene | 72.7 | 4,500 | 6,200 | 1.4 |
| 7 | H$_2$SO4[b] | 35 | toluene | 88.4 | 7,300 | 12,400 | 1.7 |
| 8 | H$_2$SO4[c] | 25 | toluene | 80.0 | 5,400 | 8,400 | 1.5 |

[a] = a comparative run illustrating the importance of a diluent.
[b] = concentrated;
[c] = 85% acid;
[d] = used 28 weight % as greater amounts cause premature precipitation of the product

EXAMPLE 3

Polycondensation of Adipic Acid with a Hydroxyl-ended Poly(1,4-(methylenecyclohexane isophthalate) Oligomer A mixture of 1.9419 g. (10.000 mmol) of dimethyl isophthalate, 2.8843 g. (20.000 mmol) of trans-1,4-cyclohexanedimethanol, 1.00 g. (3.07 mmol) of DBSA and 20.0 ml of toluene was heated with stirring to reflux in a 50 ml flask equipped with a 10 cm Vigreux distillation column with a variable take-off distillation head. After 1 hr. of reflux, 0.65 g. of methanol and methanol-toluene azeotrope, b.p. 63.6° to 65° C., was slowly distilled between intermittent periods of reflux. The Vigreux column was removed, 1.4614 g. (10.000 mmol) of adipic acid was added and the addition funnel and walls of flask were rinsed into the mixture with 5.0 ml of toluene. The bath temperature was adjusted to 60° C. and the polymerization was completed according to Example 1. The yield was 4.40 g. (83.2%) of polymer insoluble in hot methanol. GPC gave Mn=3,600, Mw=6, 330. A yield of 0.37 g. (6.9%) of polymer soluble in the hot methanol but insoluble at room temperature gave Mn=2,040, Mw 2,550 by GPC. The $^{13}$C NMR (75 MHz, CDCl$_3$, TMS) of the major product was consistent with poly(1,4-methylenecyclohexane isophthalate adipate).

EXAMPLE 4

This illustrates that the process can be run as an inverse micro-emulsion in various solvents where the aqueous component is produced in situ from the polymerization. It also shows that a micelle-forming surfactant catalyst is more effective than a non-surfactant and that hydrophobic solvents are more effective than hydrophilic solvents, such as tetrahydrofuran.

Four mixtures were prepared consisting each of 3.7643 g. (0.02000 mol) of azelaic acid, 3.4856 g. (0.02000 mol) of 1,10-decanediol, 0.003 mol of the catalysts and 10.0 ml of solvents as specified in TABLE III. The mixtures were warmed with stirring for about 15 minutes to dissolve the monomers. After cooling to room temperature all but the example with methylene chloride were solutions. The monomers in the example with methylene chloride had crystallized at room temperature. No water was added and each mixture was held for 48 hours at room temperature. The example with methylene chloride was stirred. After this period all were clear dispersions, including that made with methylene chloride. Each visibly clear dispersion was placed in a columnated beam of white light to determine if there was a colloid present by noting if there was a Tyndall effect. The polymers were then isolated.

TABLE III

| Solvent | Catalyst | Tyndall effect? | Yield (g./%) | GPC Mn × 10 − 3/ Mw × 10 − 3 |
|---|---|---|---|---|
| Toluene | DBSA | yes | 5.3/81 | 4.44/7.49 |
| Methylene Chloride | DBSA | yes | 4.8/74 | 4.10/7.16 |
| Tetrahydrofuran | DBSA | yes | 4.3/66 | 2.92/4.53 |
| Tetrahydrofuran | Methanesulfonic acid | Neglig. | slight | (c) |

"(c) The polymer was not isolated. Although some polymerization was evident, only a slight amount of methanol-insoluble polymer was produced. A second phase, probably aqueous, was beginning to form and settle out. Such phase formation and separation was not seen in the other examples."

EXAMPLE 5

This example shows how a useful higher solids coating can be prepared.

The ingredients, 20.74 g. (0.199 mol) of 2,2-dimethyl-1,3-propanediol (neopentyl glycol, NPG), 4.72 g. (0.035 mol)

of 2-ethyl-2-(hydroxymethyl)-1,3-propanediol, (trimethylolpropane, TMP), 16.59 g. of dimethyl 1,4-cyclohexanedicarboxylate (1,4-DMCD), 6.68 g. (0.034 mol) of dimethyl isophthalate, 8.05 g. (0.048 mol) of isophthalic acid, 1.62 g. (0.017 mol) of methanesulfonic acid and 18.3 ml of toluene, were weighed into a reaction vessel. The vessel was fitted with a thermometer, stirrer, distillation column, take-off head and receiver. The mixture, initially a milky-white suspension of solids, was heated with stirring to 117° C. where it refluxed. After 2 hrs. the mixture had cleared and the reflux temperature had decreased to 95° C. Then the toluene/methanol azeotrope was distilled (b.p. 64° to 65°) slowly from the mixture over a period of 2.5 hours where the temperature in the vessel increased from 95° C. to 118° C. Then, when the toluene-water azeotrope just started to distill, the heating was terminated and the clear colorless mixture was cooled to room temperature. Total reaction time was 4.5 hrs., total batch weight was 63.4 g., material balance was 98%. The mixture, while clear and colorless in ordinary light, exhibited a bluish Tyndall effect when placed in a columnated beam of light indicating an inverse microemulsion.

After 17 hrs. at room temperature a 5.0 g sample was removed from the clear, viscous, but flowable, dispersion and diluted with 10.0 ml. of methylene chloride. It became immediately cloudy on dilution indicating a suspended aqueous phase. The mixture was repeatedly extracted with water until the wash water was neutral to test paper. Final traces of water were removed by centrifugation and the solvent was evaporated at room temperature, first in a stream of air, then in a vacuum. Neutral equivalent was 4221±4 (corresponding acid number was 13.3). Neutral equivalent estimated for no reaction was 508 (corresponding acid number of 110.4). The acid number specified for a nearly identical resin formulation prepared at temperatures reaching 220° C. described in Eastman Kodak's Publication N-276A (May 1987) was 11±3. After 44 hrs. at room temperature the acid number had not changed and a 9.33 g. sample was blended with 3.0 g. of 2,4,6-tris{bis(methoxymethyl)amino}-s-triazine (CyamelR 303, American Cyanamid Company, West Patterson, N.J.) to give a flowable clear dispersion. This was coated as a 5 mil film on a 3"×5" cold rolled steel panel, dried 1 hr. in air at ambient temperature and then cured at 120° to 130° C. for 30 min. This gave a tough clear film, with a HB pencil hardness.

EXAMPLE 6

This example illustrates that the less reactive secondary carbinols will undergo polycondensation in a w/o microemulsion.

A mixture of 5.0 g. of DL-12-hydroxystearic acid (0.0166 mol., previously twice recrystallized from toluene), 10 ml. of toluene, and 1.0 g. of DBSA was heated with stirring to 50° C. to 55° C. to dissolve the monomer and then kept at this temperature with stirring in a closed container for 72 hours. Initially a small sample of the mixture gave no precipitate when added to excess methanol, but after this period the viscosity had noticeably increased and a small sample gave a precipitate when added to excess methanol. The toluene was evaporated in a stream of air and the polymer was isolated by stirring and heating the residual viscous oil with 50 ml of methanol that contained 1% pyridine. The mixture was allowed to settle with cooling and the supernatant methanol-pyridine was decanted and discarded. The polymer was washed a second time but with pure methanol instead of methanol-pyridine. The residual viscous oil was dried overnight in a vacuum at room temperature. There was obtained 4.1 g. (87.2% yield) of a low melting waxy solid, with a neutral equivalent of 5851±187.

EXAMPLE 7

The following resins (TABLE IV) were prepared using the method of Example 1 using toluene, unless otherwise noted, and are additional examples of monomer systems undergoing low temperature polycondensation in heterogeneous media. Mn and Mw were determined based on insoluble polymer after two washings in hot methanol. Runs (e) and (f) were run by the method set forth in Example 2. Run (h) was run at 70° C. and run (i) was conducted at 60° C. for 24 hr. and then at 40° C. for 48 hr. with 0.1% hydroquinone present. It was then isolated by precipitation and washing with cold methanol.

TABLE IV

| RUN | CARBOXYLIC ACID | CARBINOL | CAT. | X | % YIELD | Mn | $10^{-3}$ × Mw | $10^{-3}$ × Mw/Mn |
|---|---|---|---|---|---|---|---|---|
| a | 12-Hydroxydodecanoic | — | DBSA | 12.7 | 92.9 | 16.8 | 33.8 | 2.0 |
| b | 12-Hydroxydodecanoic | — | Amb15 | 5.4 | 91.7 | 23.9 | 57.5 | 2.4 |
| c | 12-Hydroxystearic | — | DBSA | 6.6 | 99.6 | 15.2 | 30.4 | 2.0 |
| d | 12-Hydroxystearic[d] | — | DBSA | 6.9 | 86.8 | 12.4 | 27.3 | 2.2 |
| e | 12-Hydroxystearic[d] | — | DBSA | 8.5 | 90.8 | 5.5 | 9.5 | 1.7 |
| f | 12-Hydroxystearic[d] | — | Amb15 | 1.0 | 5.9 | 1.7 | 2.1 | 1.2 |
| g | Azelaic | 1,4-Cyclohexanediol | DBSA | 12.9 | 73.0 | 9.4 | 13.4 | 1.4 |
| h | Azelaic | 1,4-Cyclohexanediol | Amb15 | 4.2 | 12.0 | 3.4 | .5 | 1.3 |
| i | Itaconic | 1,10-Decanediol | DBSA | 6.5 | 59.0 | 8.2 | 11.6 | 1.4 |

[d]= these runs were made in Nonane as the solvent. X = Monomer/H$^+$

EXAMPLE 8

The runs in TABLE V were runs in which selected monomer systems failed to undergo polycondensation in heterogeneous media and were conducted under conditions of Example 1 at 60° C. and catalyzed by DBSA.

TABLE V

| RUN | CARBOXYLIC ACID | CARBINOL | DILUENT | X | POSTULATED CAUSE OF FAILURE |
|---|---|---|---|---|---|
| a | Isophthalic | 1,4-Butane diol | toluene dichloro ethane | 6.5 | Insoluble monomer |
| b | 4-(Hydroxymethyl) benzoic | — | chloroform | 13.6 | Insoluble Product |
| c | Mandelic (Hydroxyphenyl-acetic) | — | toluene | 14.6 | Lactide formation |
| d | 2-Hydroxy-caprylic (2-Hydroxy-octanoic) | — | toluene | 16.8 | Lactide formation |

X = Monomer/H$^+$

What is claimed is:

1. A method for preparing a polyester polymer, the method comprising:

(I) dispersing in a hydrophobic diluent one or more reactive monomers selected from the group consisting essentially of:
  (i) monomers having at least two hydroxyl groups;
  (ii) monomers having at least two carboxyl groups and,
  (iii) monomers having a combination of hydroxyl groups and carboxyl groups, wherein there are present in the diluent, species having at least one hydroxyl group and at least one carboxyl group, each such monomer having at least partial solubility in the diluent;

(II) adding a strongly acidic catalyst to (I) which will form a separate dispersed phase;

(III) reacting the monomers and the catalyst at a time and at a temperature sufficient to form by-produced water and, a product which is pre-selected from the group consisting essentially of:
  a. an inverse dispersion;
  b. an inverse emulsion or
  c. an inverse microemulsion, with the proviso that during the reaction in (III), any water that is generated during the reaction is adjusted such that the amount of water present in (III) at the end of the reaction is from 1 to 20 weight percent based on the total incipient monomer weight in (I).

2. The method of claim 1 wherein the temperature is from 0° to 150° C.

3. The method of claim 1 wherein the catalyst is sulfuric acid.

4. The method of claim 1 wherein the catalyst is selected from a group consisting essentially of
  i an alkyl sulfonic acid,
  ii substituted alkyl sulfonic acid,
  iii an aryl sulfonic acid, and
  iv substituted aryl sulfonic acid.

5. The method as claimed in claim 4 wherein the catalyst is surface-active.

6. The method of claim 1 wherein the catalyst is selected from a group consisting essentially of
  i N-alkyl sulfamic acid,
  ii substituted alkyl sulfamic acid,
  iii aryl sulfamic acid,
  iv a substituted aryl sulfamic acid,
  v an alkyl half-ester of sulfuric acid,
  vi substituted alkyl half-ester of sulfuric acid,
  vii aryl half-ester of sulfuric acid, and
  viii substituted aryl half-ester of sulfuric acid
  ix a bisulfate salt of a cationic surfactant.

7. The method of claim 1 wherein the catalyst is selected from a group consisting of insoluble particulate solids consisting of:
  i acidic sulfonated cross-linked polystyrenes;
  ii super-acidic sulfonates derived from poly(tetrafluoroethylene);
  iii acidic clays, and
  iv super-acidic metal oxide clusters.

8. The method of claim 4 wherein a carboxyl-bearing sulfonic acid is incorporated into the polyester polymer.

9. The method of claim 4 wherein a carbinol-bearing sulfonic acid is incorporated into the polyester polymer.

10. The method of claim 1 wherein the monomers are those used to prepare polyester binders for coatings.

11. The method of claim 1 wherein the monomers are those used to prepare polyester binders for inks.

12. The method of claim 1 wherein the monomers are those used to prepare polyester binders for adhesives.

13. A polymer when prepared by the method of claim 1.

14. A polymer as claimed in claim 13 which is selected from the group consisting essentially of polymeric polyester binders and polymeric alkyd binders for coatings.

15. A polymer as claimed in claim 13 which is selected from the group consisting essentially of polymeric polyester binders and polymeric alkyd binders for inks.

16. A polymer as claimed in claim 13 which is selected from the group consisting essentially of polymeric polyester binders and polymeric alkyd binders for adhesives.

17. Aqueous dispersions of the polymers of claim 14.

18. Aqueous dispersions of the polymers of claim 15.

19. Aqueous dispersions of the polymers of claim 16.

* * * * *